(12) United States Patent
Lin

(10) Patent No.: US 6,921,877 B2
(45) Date of Patent: Jul. 26, 2005

(54) EDM DRILL

(75) Inventor: Tong-Han Lin, Tainan Hsien (TW)

(73) Assignee: Tai-I Electron Machining Co., Ltd., Tainan Hsien (TW)

( * ) Notice: Subject to any disclaimer, the term of this patent is extended or adjusted under 35 U.S.C. 154(b) by 0 days.

(21) Appl. No.: 10/418,272

(22) Filed: Apr. 18, 2003

(65) Prior Publication Data

US 2003/0192861 A1 Oct. 16, 2003

Related U.S. Application Data

(63) Continuation-in-part of application No. 09/649,601, filed on Aug. 29, 2000, now abandoned.

(51) Int. Cl.$^7$ .............................. B23H 1/04; B23H 7/26
(52) U.S. Cl. .................................................. 219/69.15
(58) Field of Search ........................ 219/69.15; 483/18, 483/21, 30, 31, 900, 902

(56) References Cited

U.S. PATENT DOCUMENTS 3,704,510 A * 12/1972 Sedgwick et al. ............. 483/9
4,515,479 A * 5/1985 Pryor ........................... 356/615
4,563,800 A * 1/1986 Bonga ........................... 483/16
4,739,145 A * 4/1988 Check et al. ............. 219/69.15
4,992,639 A * 2/1991 Watkins et al. ............ 219/69.2
5,248,867 A * 9/1993 Ohba et al. ............... 219/69.15
5,306,888 A * 4/1994 Kaneko et al. .......... 219/69.12
5,453,933 A * 9/1995 Wright et al. ................ 700/181
6,086,684 A * 7/2000 Saito et al. .................. 148/220
6,127,642 A * 10/2000 Gleason et al. .......... 219/69.15
6,396,022 B1 * 5/2002 Suzuki ..................... 219/69.15

FOREIGN PATENT DOCUMENTS

| JP | 7-24649 A | * | 1/1995 |
| JP | 8-290322 A | * | 11/1996 |
| WO | WO-00-23222 A1 | * | 4/2000 |

* cited by examiner

*Primary Examiner*—Geoffrey S. Evans
(74) *Attorney, Agent, or Firm*—Rosenberg, Klein & Lee

(57) ABSTRACT

An EDM drill is provided which includes an automated electrode tube replacing mechanism for fully automated and continuous operation. The EDM drill further includes an electrode tube guide selection device to allow the fully automated and continuous operation on holes of various diameters.

5 Claims, 9 Drawing Sheets

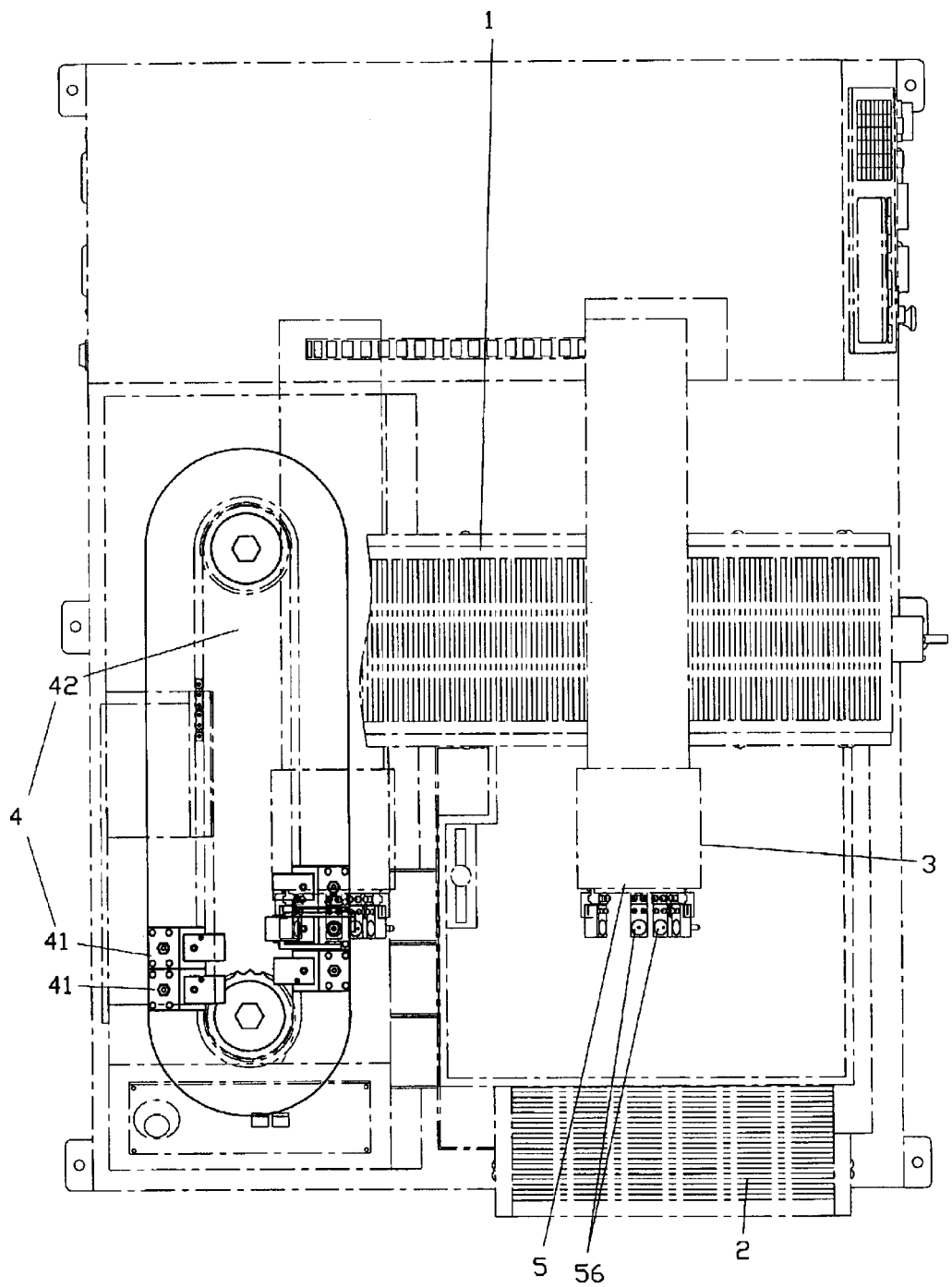
F I G . 2

EDM DRILL

This application is a Continuation-in-Part of the application filled Aug. 29, 2000, Ser. No. 09/649,601, now abandoned.

BACKGROUND OF THE INVENTION (a) Field of the Invention

The present invention relates to an EDM drill, and more particularly, to one comprised of an electrode tube changer and guide changer capable of replacing, and selecting an electrode tube and guide to achieve fully automated and continuous operation of hole discharge processing (drilling) on work pieces of different thickness and hole size.

(b) Description of the Prior Art

Please refer to FIG. 9.

EDM drilling: Chucking an electrode tube (P) on a spindle. Adjust a W-axis (W) on an X-axis (X) and a Y-axis (Y) to a starting position of a work piece. Move an electrode tube guide (G) of the W-axis (W) to where above the work piece at a proper height while allowing the electrode tube (P) pass through the guide (G). Activate a C-axis (C) to rotate the electrode tube (P) and mostly supply the dielectric fluid, and control a Z-axis (Z) movement according the condition between the electrode tube (P) and the work piece to drill a hole into the work piece by electrical-discharge power.

The prior art is observed with the following limitations: (1) It is difficult to automatically replace the electrode tube since the electrode tube practically gives no rigidity. For that reason, it prevents the use of a device like an ATC (Automatic Tool Changer) that is used by a machining center to chuck the electrode tube to the spindle today. (2) It prevents the automatic selection of a different guide size which is needed to hold different size of electrode in order to drill different size of hole.

SUMMARY OF THE INVENTION

The first purpose of the present invention is to provide an EDM drill which contains a means for automated exchange of the electrode tube. The consumed electrode tube or the electrode tube with a length not sufficient for the next round of process is automatically replaced to ensure the continuous and automated processing.

Another purpose yet of the present invention is to provide an EDM drill, containing further a means for selecting an electrode tube guide so to process holes of different sizes continuously and automatically.

BRIEF DESCRIPTION OF THE DRAWINGS

FIG. 2 is a top view of the electrode tube storage and carrousel devices of the present invention.

DETAILED DESCRIPTION OF THE PREFERRED EMBODIMENTS

Figure 1:
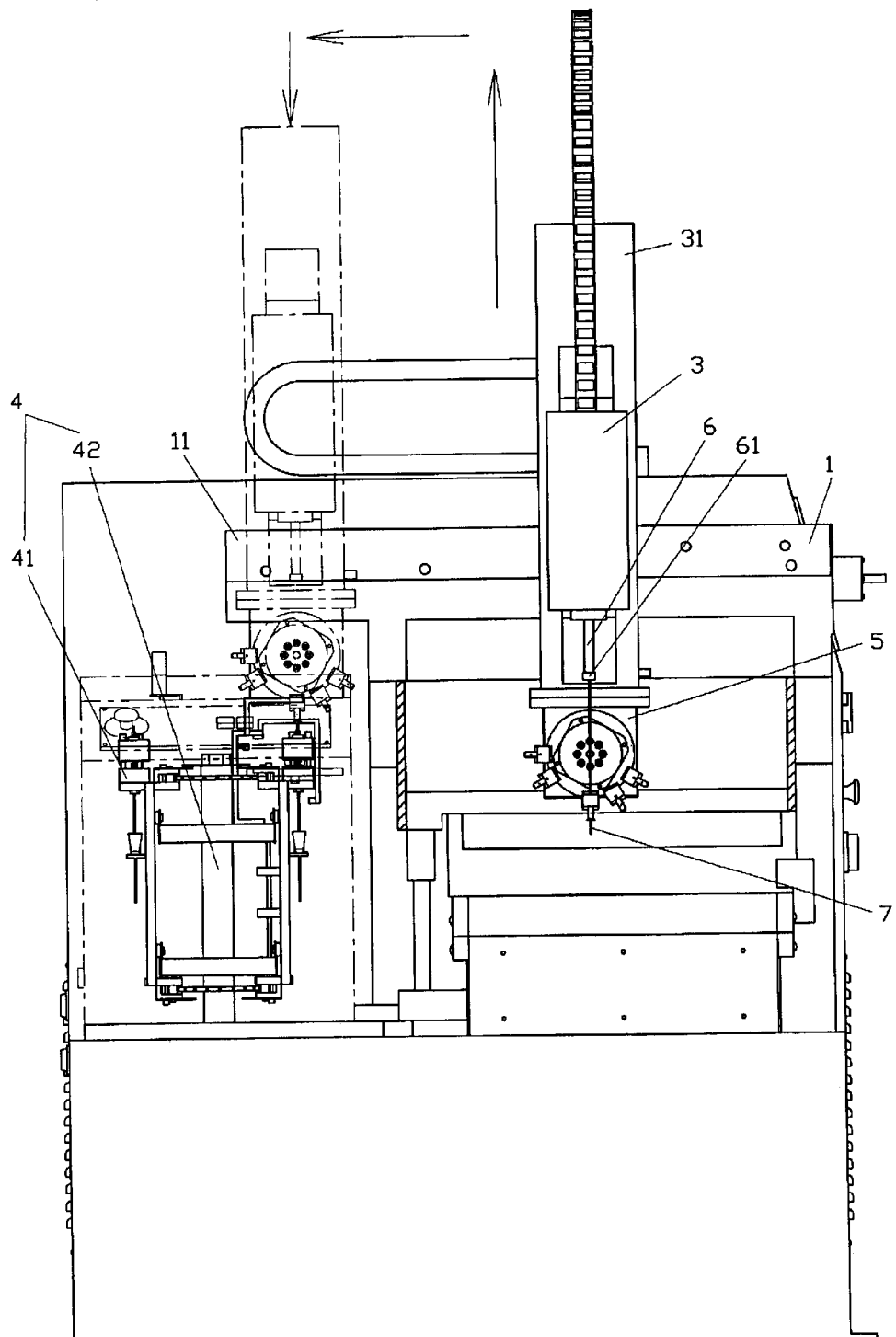
FIG. 1 is a front view showing the operation of unloading an electrode tube storage device and a spindle nut of the present invention.
Figure 6:
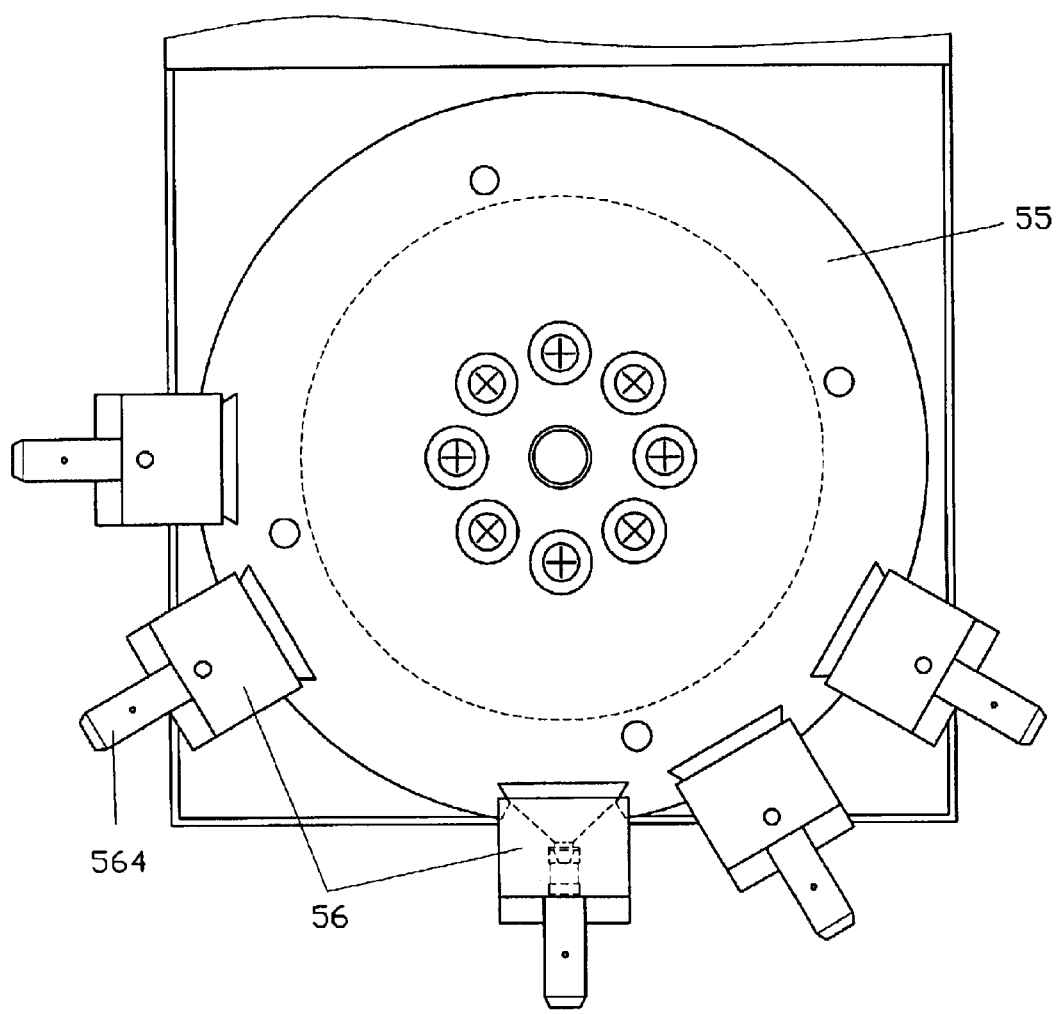
FIG. 6 is a front view of the guide selection device of the present invention.
Figure 7:
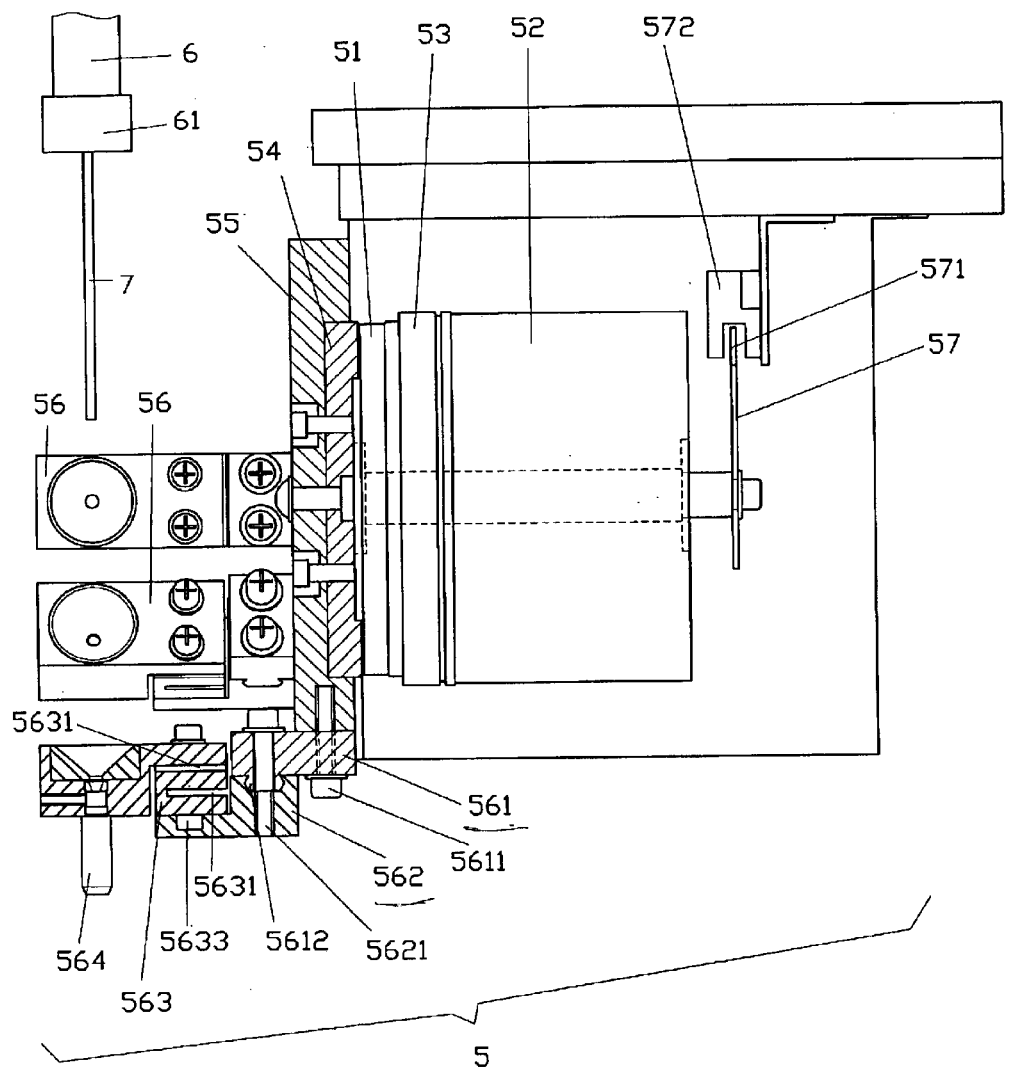
FIG. 7 is a side view of a guide selection device of the present invention.

As illustrated in FIGS. 1 and 2, the preferred embodiment of the present invention is comprised of an electrode tube storage device (4) and an electrode tube guide selection device (5) (also refer to FIGS. 6 and 7). The electrode tube storage device (4) is comprised of a plurality of electrode tube storage units (41) and other components to form a mobile electrode tube carousel (42), which is connected to engage in a cyclic movement. The preferred embodiment also contains a W-axis (31) operating on the existing an X-axis (1), or a Y-axis (2) and a spindle (6). Wherein, the X-axis (1) extends itself to become an extended X-axis (11) to provide access to the electrode tube storage device (4). The construction of a cyclic connection conveyer for the electrode tube carousel (42) is formed with cyclic chains. Under normal condition, a spindle nut (61), an electrode tube (7) and a leak-proof seal (71) are provided to each electrode tube storage unit (41). In operation, the electrode tube storage carousel (42) may deliver a single storage unit (41) in cycle to a designated point in position while the W-axis (31) moves at the X-axis (1), or the Y-axis (2) and the extended X-axis (11) to where above the electrode tube (7). The W-axis (31) also moves longitudinally parallel to a Z-axis (3) and the spindle (6) turns clockwise or counter-clockwise to load or unload the electrode tube (7).

The electrode tube guide selection device (5) can turn to any selected guide unit (56) with a proper size guide (564) on it for the insertion by the electrode tube (7).

Figure 3:
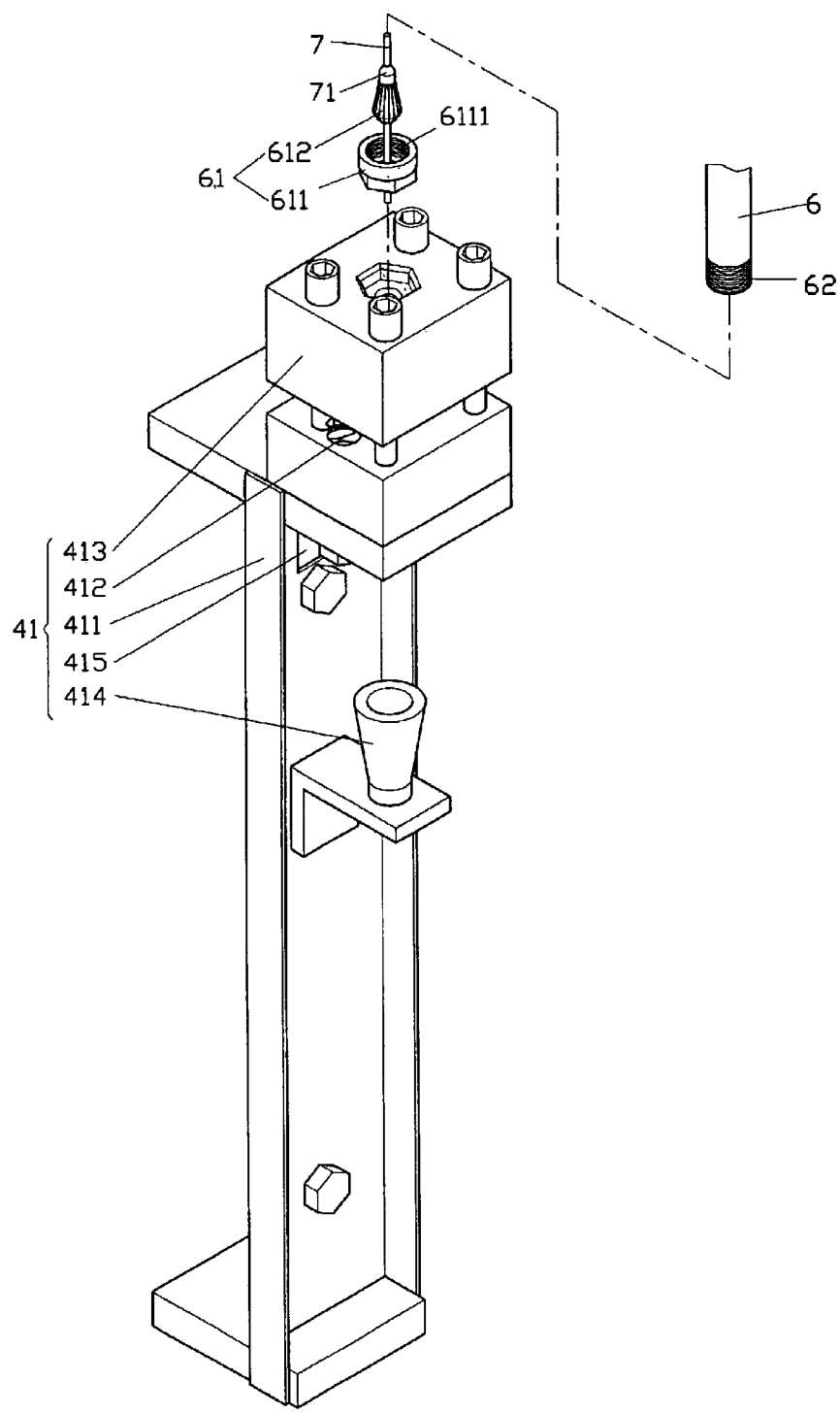
FIG. 3 is a perspective drawing showing the electrode tube storage device and the spindle nut assembly of the present invention.
Figure 4:
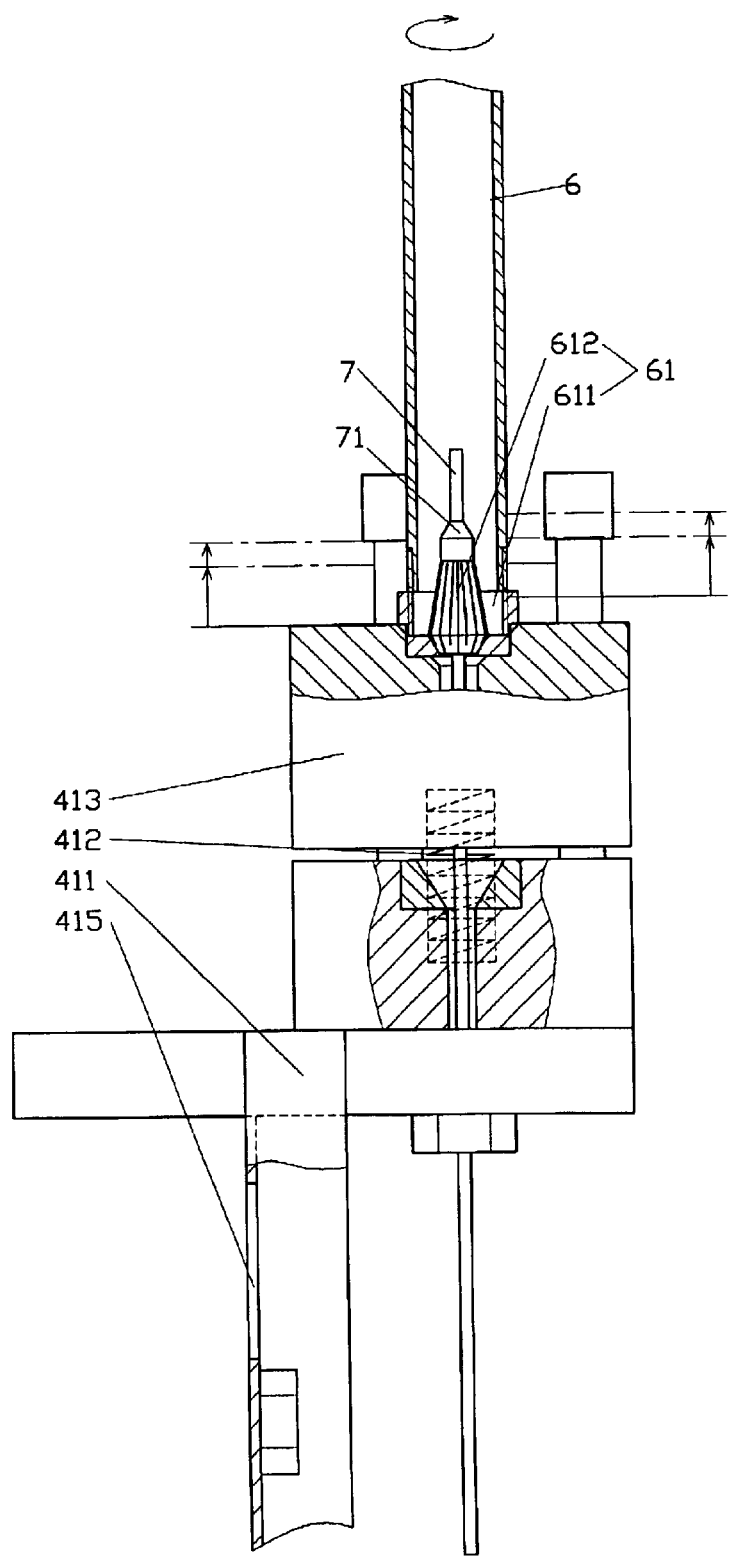
FIG. 4 is a side view showing the operation of loading the electrode tube storage device and the spindle nut of the present invention where screw threads of the spindle and the spindle nut are not engaged.

As illustrated in FIG. 4, the electrode tube storage unit (41) of the present invention relates to a rigid member (411) comprised of an elastic member (412) to absorb change in length resulted while combining or releasing the spindle nut (61) by the spindle (6), and a holder (413) to store and restrict the rotation of the spindle nut (61). Wherein, the holder (413) of the spindle nut (61) can be provided at the upper end of a frame (411) while a corresponding concave that can hold local profile of the spindle nut (61) is provided on the holder (413). An electrode tube-guarding duct (414) is provided on the frame (411) and a through-hole (not illustrated in the accompanying drawings) in upside-down cone shape is formed inside the electrode tube-guarding duct (414), which is used to protect the stored electrode tube from shaking too much during carousel movement. The spindle nut (61) as illustrated in FIG. 3 has a nut (611) containing a collet (612) and the collet (612) chucks both of the electrode tube (7) and its leak-proof seal (71). Female threads (6111) inside the nut (611) and male threads (62) provided at the lower end of the spindle (6) are tightened or loosened to load or unload the spindle nut (61), the seal (71) and the electrode tube (7) as a whole unit.

FIG. 4 shows the cutaway view of chucking the electrode tube (7). Wherein, the spindle (6) descends until it holds against both of the nut (611) of the spindle nut (61) and the holder (413)[The nut (611) contains the collet (612), the electrode tube (7), and the seal (71)] to press against the holder (413). So the holder (413) descends and compresses the elastic member (412) to a proper position but not all way down to the end. At this time, the spindle (6) turns clockwise to engage both of the spindle nut (61) and the spindle (6) while chucking tightly the collet (612).

The seal (71) is pressed and the electrode tube (7) properly chucked. Meanwhile, the elastic member (412) pushes back the holder (413) for the holder (413) to maintain restricting the nut (611) from rotating until it is screwed into the spindle (6).

Figure 5:
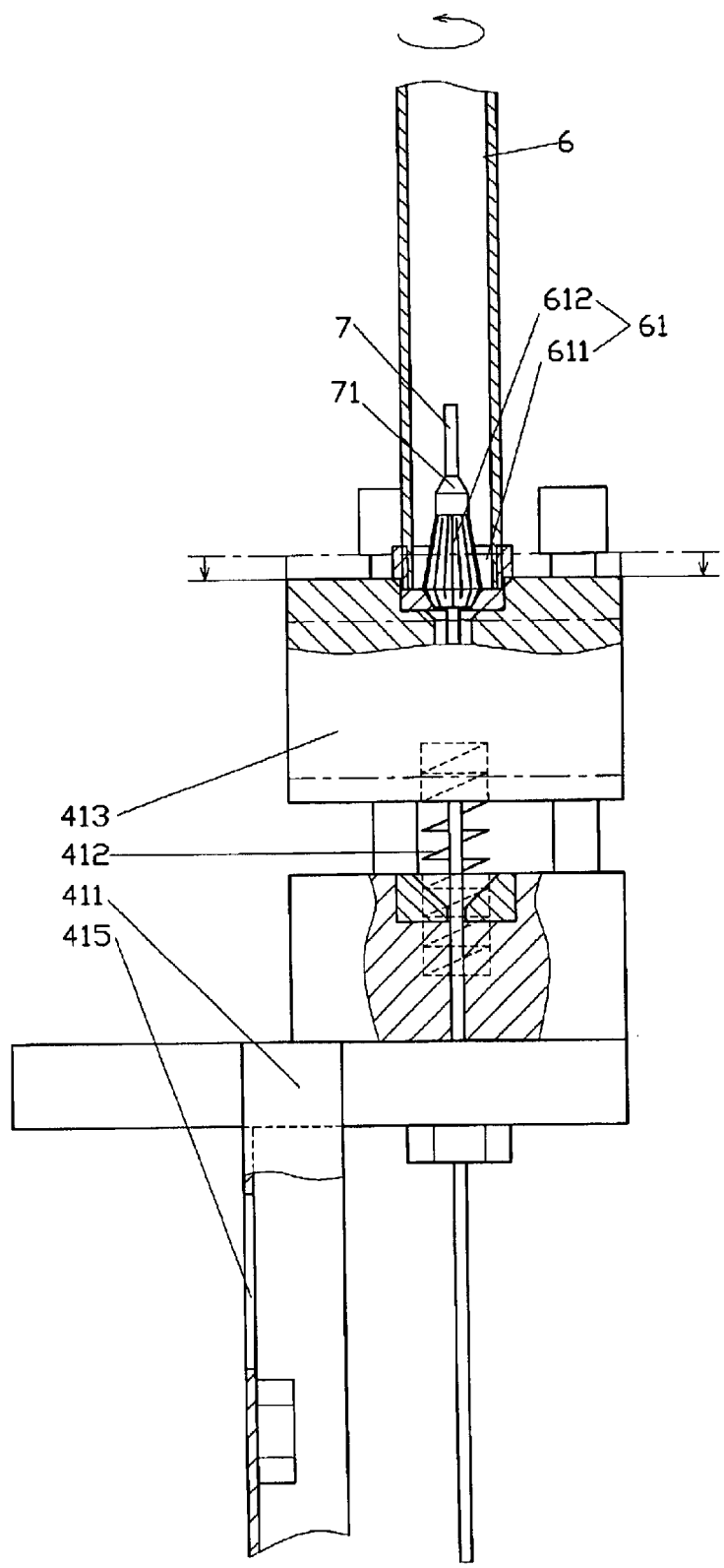
FIG. 5 is a side view showing the operation of loading the electrode tube storage device and the spindle nut of the present invention where screw threads of the spindle and the spindle nut are engaged.

As illustrated in FIG. 5, while unloading the electrode tube (7), both the spindle (6) and the spindle nut (61) are descending to where the nut (611) merely presses against and descends the holder (413) until the nut (611) clears away from the spindle (6). Wherein, the elastic member (412) absorbs the change in length or the movement of the releasing nut (611). That is, the spindle (6) creating a movement of the spindle nut (611) by fastening or releasing the spindle nut (611), and absorbing the movement of the spindle nut (611) by the elastic member (412).

As illustrated in FIGS. 6 and 7, the preferred embodiment of the guide select means of the present invention is comprised of an encoder (51), a motor (52), brake (53), a gear (54), a rotating plate (55), a plurality of guide units (56), a home position plate (57). Wherein, the encoder (51) gives the turning angles of the rotating plate (55) or the motor (52). The brake (53) is used to restrict the gear (54), but the brake (53) may be unnecessary in case of that the backlash of the gear (54) is not big enough to affect the positioning accuracy. The gear (54) is fixed to the rotating plate (55) while the circumference of said rotating plate (55) is used to hold the guide unit (56) in position. The home position plate (57) is fixed to a turning shaft of the rotating plate (55). A mark (571) is protruding from the home position plate (57) by a sensor (572) in a cycle of rotation by the home position plate (57).

Figure 8:
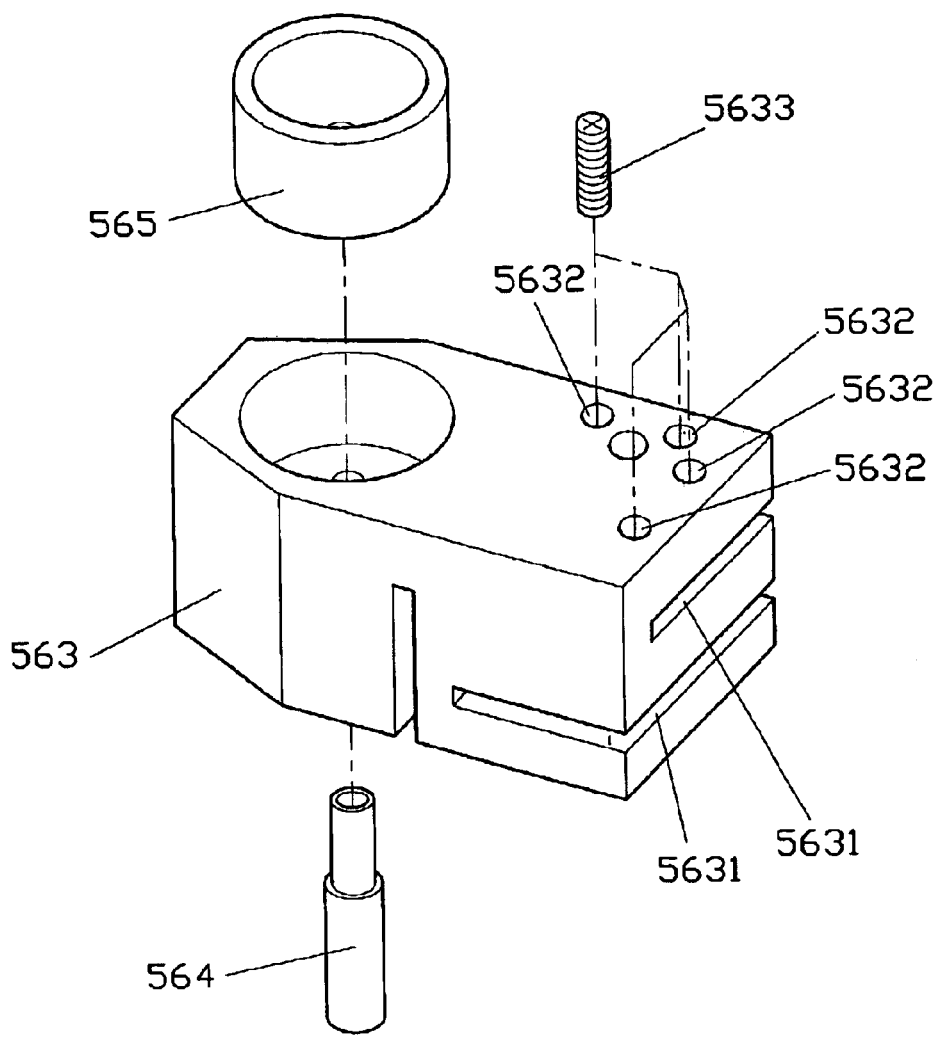
FIG. 8 is an exploded drawing showing a guide holder used by the guide selection device of the present invention.
Figure 9:
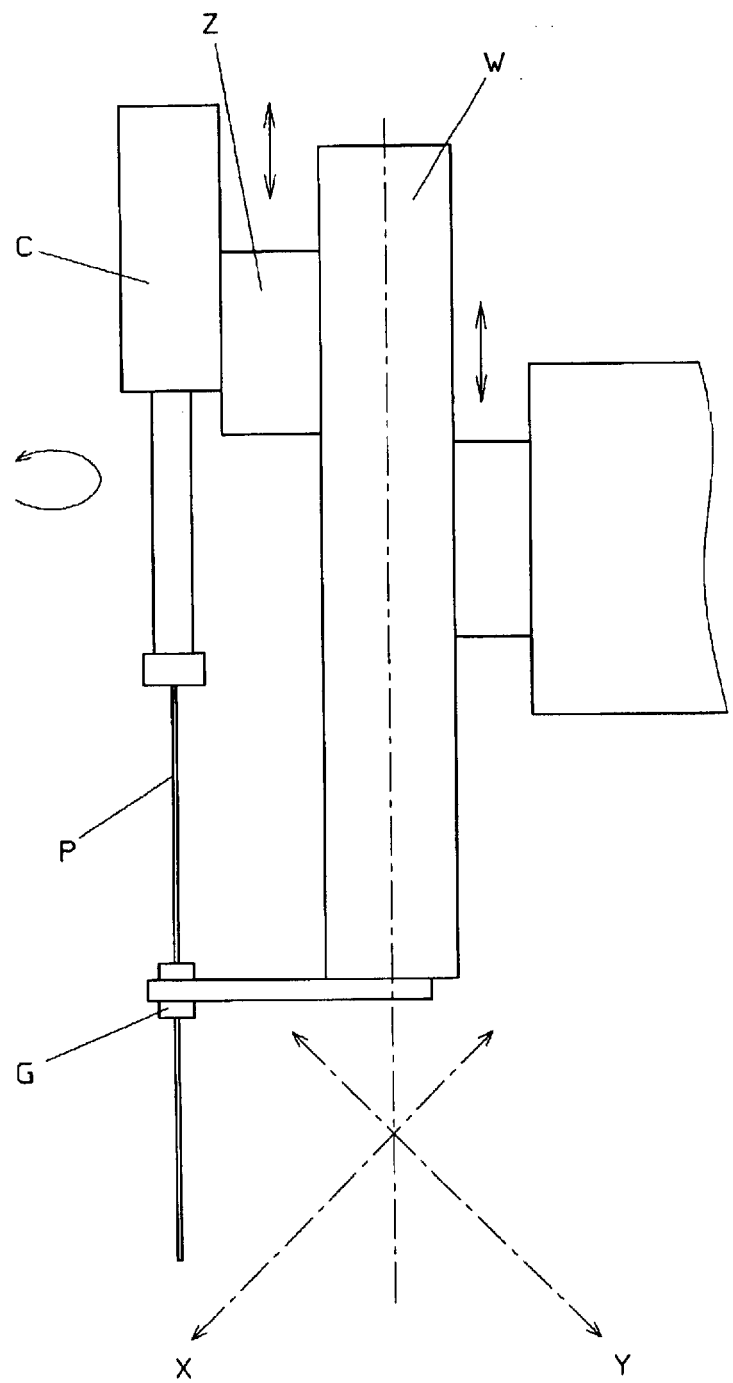
FIG. 9 is a drawing of a prior art.

FIG. 8 shows the detailed construction of the guide unit (56). As shown in FIGS. 6 and 7, the guide unit (56) is comprised of a fixation plate (561), a slide (562), a guide a holder (563), a guide (564) and a hopper (565). An oval opening (not illustrated) is provided below the fixation plate (561)(not illustrated) for a bolt (5611) to go through and fix to the rotating plate (55) and for inching the relative position between the guide unit (56) and the rotating plate (55). A dovetail (5612) is provided to the fixation plate (561) so to relatively caulk to each other with the slide (562) while inching their relative positions. The slide (562) is further connected with a bolt (5633) to the guide holder (563) whereupon the guide (564) is provided. A plurality of grooves (5631) are provided on the guide holder (563), and a plurality of bolting holes (5632) and bolts (5633) are provided on the guide holder (563). The grooves (5631) are in parallel on a horizontal plane while the bolting holes (5632) are at a right angle to the grooves (5631) and bolted to bolts (5633). Once the bolt (5633) rotates, space inclination of the grooves (5631) changes accordingly for inching the vertical degree of the guide unit (56), thus making the guide unit (56) is in the same axis with that of the spindle (6), as illustrated in FIG. 9. The hopper (565) is used to guide the electrode tube (7) into the guide (564).

In the preferred embodiment, at least one set of the guide unit (56) may be provided on the rotating plate (55) and the encoder (51) may be used to give the rotating plate (55) or the motor (52) for automated control the rotation angle of the rotating plate (55), thus the guide to the guide unit (56) required can be turned to stop at a proper position for the electrode tube (7) descending along the Z-axis (3) to pass through the guide (564) and achieve the purpose of selecting the desired guide (564). The reference point in the preferred embodiment is defined by the mark (571) of the home position plate (57). Once the motor (52) starts, the sensing by a sensor (572) is designated as the marker (571) of starting point for the determination and control to ensure that the guide unit (56) rotates to its correct position.

I claim:

1. A method of loading or unloading an electrode tube to a spindle in an electro-erosion drilling machine, comprising the steps of:

a) providing screw threads on both said spindle and a spindle nut and by rotating said spindle, said spindle nut being attached or detached to said spindle by controlling a rotation direction of said spindle;

b) providing a recess at a position of setting said spindle nut to hold said spindle nut from turning during rotation of said spindle, so that said threads will be engaged to or disengaged from said spindle, and c) providing an elastic member to absorb a displacement created during engagement and disengagement of said spindle nut and to provide a threading tension.

2. A method for automatically changing a tube guide in an electro-erosion drilling machine having a spindle, a rotating plate mounted below said spindle, and a plurality of guide units located on said rotating plate respectively supporting tube guides that are positionable into alignment with said spindle, comprising the steps of:

a) raising said spindle such that an electrode tube is clear of said guide units;

b) rotating said rotating plate to a position where one of said guide units which holds a desired tube guide in alignment with said spindle; and c) lowering said spindle to insert said electrode tube into said aligned tube guide.

3. A method for automatically changing an electrode tube and tube guide in an electro-erosion drilling machine, comprising the steps of:

unloading an electrode tube by:
   a) positioning a spindle over a tube storage unit and engaging a spindle nut in a recess on said tube storage unit; and
   b) unloading an electrode tube from said spindle, said electrode tube being unloaded responsive to rotation of said spindle relative to said spindle nut in a first direction; and, loading an electrode tube and changing a guide unit by:
   a) positioning said spindle over a tube storage unit having said spindle nut on said tube storage unit,
   b) loading an electrode tube on said spindle, said electrode tube being loaded responsive to rotation of said spindle relative to said spindle nut in a second direction, said second direction being opposite said first direction, and
   c) selecting a guide unit subsequent to loading said electrode tube, said guide unit being selected by rotating a rotating plate to position a selected guide unit mounted thereon in alignment with said spindle.

4. An electro-erosion drilling machine having an automatic electrode tube changer comprising:

a spindle having threads formed on a distal end thereof;
   a spindle nut threadedly engageable on said spindle to hold an electrode tube thereon;

a tube storage unit having a holder for receiving said spindle nut and restricting rotation thereof, wherein said spindle nut received in said holder is engaged and disengaged from said spindle responsive to rotation of said spindle in one of two opposing directions; and, an elastic member coupled between said spindle nut and said tube storage unit for compensating for displacement of said spindle nut during rotation of said spindle.

5. An electro-erosion drilling machine having an automatic electrode tube guide changer comprising a rotatable spindle linearly displaceable along an axis thereof, a rotating plate mounted below said spindle, and a plurality of guide units mounted to said rotating plate for rotation therewith, a selected one of said plurality of guide units supporting a desired tube guide being positionable in aligned relationship with said spindle without further movement responsive to a rotative displacement of said rotating plate, wherein said rotating plate holds said tube guide and said selected tube guide holds a tube during drilling by descending the spindle to insert said tube into said selected tube guide.

* * * * *